United States Patent [19]
Balken

[11] Patent Number: 4,784,005
[45] Date of Patent: Nov. 15, 1988

[54] CRANK DRIVE HAVING FOUR SPACIALLY EXTENDING AXES INTERSECTING IN ONE POINT

[75] Inventor: Jochen Balken, Lindau, Fed. Rep. of Germany

[73] Assignee: Lindauer Dornier Gesellschaft mbH, Lindau/Bodensee, Fed. Rep. of Germany

[21] Appl. No.: 105,391

[22] Filed: Oct. 5, 1987

[30] Foreign Application Priority Data

Oct. 18, 1986 [DE] Fed. Rep. of Germany ....... 3635545

[51] Int. Cl.$^4$ ..................... F16H 21/18; F16H 21/42
[52] U.S. Cl. .......................................... 74/42; 74/785
[58] Field of Search ................. 74/42, 43, 47, 48, 785

[56] References Cited

U.S. PATENT DOCUMENTS

| | | | |
|---|---|---|---|
| 128,306 | 6/1972 | Harvey | 74/47 |
| 232,624 | 9/1880 | Zeigler | 74/42 |
| 968,046 | 8/1910 | Griggs et al. | 74/47 |
| 3,368,412 | 2/1968 | Conlee | 74/42 |
| 3,859,861 | 1/1975 | Buschi | 74/42 |

FOREIGN PATENT DOCUMENTS

| | | |
|---|---|---|
| 2646026 | 4/1977 | Fed. Rep. of Germany . |
| 2309876 | 2/1978 | Fed. Rep. of Germany . |
| 3029642 | 2/1981 | Fed. Rep. of Germany . |
| 3037814 | 5/1982 | Fed. Rep. of Germany . |
| 8225921 | 3/1983 | Fed. Rep. of Germany . |
| 3501550 | 4/1986 | Fed. Rep. of Germany . |
| 896294 | 1/1982 | U.S.S.R. ........................... 74/47 |
| 1035320 | 8/1983 | U.S.S.R. ........................... 74/42 |

Primary Examiner—Allan D. Herrmann
Attorney, Agent, or Firm—W. G. Fasse; D. H. Kane, Jr.

[57] ABSTRACT

A crank drive has four axes extending in space and intersecting in a common point. The angles between two neighboring axes are adjustable as required. These angles are enclosed between the drive shaft and the power take-off shaft and between intermediate axes. Thus, it is possible to superimpose different individual operational sequences on one another to realize complicated transmission functions. Such so-called "spacial" crank drives are, for example, suitable for shuttleless looms having gripper rods. In such a loom the present spacial crank drive permits the adjustment of the displacement or insertion stroke of the gripper rods and the simultaneous adapting of the end positions of the gripper rods to the individual requirements while still maintaining the pause durations and permitting, if necessary, different feed advance speeds for the individual gripper rods.

9 Claims, 9 Drawing Sheets

CRANK DRIVE HAVING FOUR SPACIALLY EXTENDING AXES INTERSECTING IN ONE POINT

FIELD OF THE INVENTION

The invention relates to a so-called spacial crank drive having four axes intersecting in one point for transforming a rotating drive motion into an oscillating power take-off motion.

DESCRIPTION OF THE PRIOR ART

Crank drives of the above type are known in the art and have a drive shaft and a power take-off shaft, a connecting member and a transmission member. The connecting member is arranged eccentrically to the drive shaft and its spacing to the drive shaft is adjustable. The transmission member is pivotally connected to the power take-off shaft.

These so-called "spacial" crank drives are known to have been used for special purposes, for example, as a "Hook's key" or as a wobbling plate transmission. These devices were made for special purposes in different technical fields. It has also been suggested to use these crank drives on weaving machines In all those instances where these devices have been used, it is necessary to convert a rotating motion of a drive shaft into a back and forth oscillating movement of a driven or power take-off shaft, whereby the driven or power take-off axis is located at an angle relative to the drive shaft. Generally, that angle is a right angle.

It is also known to use this type of crank drive for converting a rotating drive movement into an also rotating power take-off movement, whereby the angular velocities are distorted on the power take-off side. This type of crank is useful where it is necessary to convert a continuous or uniform rotational drive motion into a nonuniform motion of the driven component. In any event, these "spacial" crank drives are of substantial importance in all those instances in which it is necessary to change the displacement or stroke or the amplitude of an oscillating motion on the power take-off side because this can be done by the adjustment of the geometric ratios of the "spacial" crank drive.

German Patent (DE-PS) No. 3,501,550 describes the use of a spacial crank drive in a shuttleless loom in which the crank drive converts the uniform rotational drive motion of a drive shaft in the loom into an oscillating power take-off motion of an output member having an axial location different from that of the input drive shaft. The entire spacial crank drive is arranged on a carrier arm which in turn is tiltably secured to the loom frame together with the slay. Thus, the crank drive is tiltable together with the carrier arm. A stroke lever rotates with the drive shaft and this stroke lever is connected to a crank bail of the spacial crank drive by means of a hinge or journal pin. The power take-off shaft of the spacial crank drive is arranged at right angles to the drive shaft and the spacial crank drive causes the power take-off shaft to perform an oscillating motion. A rack and pinion device transmits this oscillating motion to cause the back and forth movement of the weft thread insertion means. The stroke lever and also the hinge or journal pin are rigidly and unadjustably connected to the crank bail. The transmission ratios of the spacial crank drive according to German Patent (DE-PS) No. 3,501,550 are thus fixed and hence are not adaptable to different types of use.

German Patent Publication (DE-OS) No. 3,029,642 describes a drive mechanism for a tape gripper loom, whereby a uniform rotational drive motion is transformed by the spacial crank drive into an oscillating power take-off motion which is then transmitted through a rack and pinion onto the gripper drive. The power take-off axis extends at a right angle to the axis of the drive shaft of the spacial crank drive. The eccentricity of the drive point rotating with the drive shaft or the spacing of the drive point from the oscillating axis is adjustable in order to adapt the oscillation stroke or amplitude of the power take-off motion to the variable width of the fabric being woven or to a variable loom width. Stated differently, the angle enclosed between the axis of the drive shaft and the axis between the driving point and the common point of intersection is modified in one or another way to thereby adjust the oscillation stroke or amplitude of the power take-off motion.

German Utility Model (DE-GM) No. 8,225,921 describes a further drive device for a band gripper in a loom. Here again, a spacial crank drive translates a rotational motion of the drive shaft into an oscillating motion of the power take-off shaft, whereby the oscillating motion is transmitted through rocker arms and coupling means to an oscillating rack and pinion for the gripper members The geometry of the driving spacial crank drive is fixed and hence cannot be adjusted. However, an adjustment possibility for changing the gripper stroke is provided outside of the spacial crank drive. This adjustment is possible in the coupling with the oscillating toothed rack. For this purpose, the coupling rod is adjustably secured to a rocker arm. Thus, it is possible that the one end position of the oscillation, that is the one end position of the back and forth movable gripper, is not displaced when the oscillating stroke or amplitude is changed or varied.

German Patent Publication (DE-OS) No. 3,037,814 discloses a device for driving the heald shafts of a loom with the aid of a spacial crank drive operating an intermediate shaft, whereby the eccentricity of the driving point of the crank drive determines the oscillation stroke or amplitude and also the angular speed of the intermediate shaft. The oscillation movement of the intermediate shaft is transmitted by a parallel lever rocker arm to the draw knives or the abutment beam lever carrying the shaft of a heald loom. Constant power take-off angles at the output of the heald machine shaft are obtained in that an adjustment is provided for the coupling of the parallel lever rocker. German Patent Publication (DE-OS) No. 3,037,814 suggests to operate the spacial crank drive with a small oscillation amplitude at its power output to obtain a flat transmission characteristic in order to obtain sufficiently long dwell times during operation. This approach poses the problem that the stroke at the heald machine may not be sufficient. In order to alleviate this problem it is suggested in this prior art that this parallel lever rocker arm should be adjustable.

German Patent Publication (DE-OS) No. 2,309,876 shows yet another device for converting a rotational motion into an oscillating motion in connection with tape looms. In this prior art device the eccentricity of the driving point relative to the driving shaft is the determining factor for the amplitude of the oscillating movement at the power output. There is, however, no disclosure in this prior art as to how the end positions of the oscillating motion are adaptable, or rather, how one or the other end position remains uninfluenced by a change in the stroke. This publication mentions briefly that a change in the angular position between the axis of the drive shaft and the axis of the power output will cause a nonsymmetric oscillating motion with differing angular speeds at the power output. A nonsymmetric motion shall also be achievable in that the power output shaft is displaced in parallel so that all four axes no longer intersect in one point.

Reference is made to German Patent Publication (DE-OS) No. 2,646,026 in order to show that so-called spacial crank drives are used in the art, not only in connection with weaving machines, but also in other areas, for example, in connection with agricultural equipment. This reference discloses an apparatus for spreading synthetic fertilizer, whereby the crank drive is used for varying the spreading amplitude by varying the eccentricity of the driving point. Any other variations or influences of the spacial crank drive are not disclosed in this reference.

The prior art described above provides for varying the stroke or the oscillation amplitude and for this purpose, if it is achieved at all, external structural components outside the spacial crank drive are necessary in order to at least fix the end position of the power output oscillating motion when the stroke or amplitude is adjusted

OBJECTS OF THE INVENTION

In view of the foregoing it is the aim of the invention to achieve the following objects singly or in combination:

to provide a spacial crank drive having four axes intersecting in a single point in such a way that the crank drive is capable of performing complicated force transmission functions;

to provide a crank drive of the above type capable of permitting a stroke or amplitude adjustment while simultaneously assuring a determined end position of the stroke motion at both ends of the stroke or oscillating motion;

to provide a crank drive in which the dwell times and/or the oscillation amplitudes are adjustable; and to provide a crank drive that is applicable in looms as well as in any other equipment requiring a precise control of the conversion of a rotating motion into an oscillating motion.

SUMMARY OF THE INVENTION The crank drive according to the invention is characterized in that the drive shaft and a power take-off or output shaft take up axial positions fixed in space during operation while intermediate drive shafts between the input shaft and the output shaft are adjustable in their angular position in such a way that each of the intermediate shafts between the input and output shafts can be adjusted selectively and independently of any adjustment of any of the other intermediate shafts.

According to the invention the arrangement is such that all practically useful angular positions are adjustable in a stepless manner. A crank gear constructed as taught by the invention can be adjusted for satisfying the most varied transmission function requirements. Thus, for example, in connection with shuttleless looms, the present crank drive can be used for driving and controlling the back and forth movement of the gripper rods travelling into and out of the loom shed According to the invention the end positions of the gripper rods are precisely adjustable by varying the angular position between the drive shaft and the rotational shaft of the rotating coupling member. Stated differently, the end positions of the back and forth movements of the gripper rod are adjustable as desired by the adjustment of the eccentric position of the driving point and by the adjustment of the angular position between the rotational axis of the transmission member and the tilting axis of the transmission member. Similarly, in connection, for example, with agricultural equipment, it is possible to adjust in addition to the above mentioned spreading amplitude, also a displacement of the spreading range by adjusting the spacial crank drive according to the invention.

In connection with the use of spacial crank drives for driving the weft thread insertion gripper rods in shuttleless looms, it may be advantageous, to connect the present spacial crank drive in series with a planetary gear drive which translates the transmission to higher speeds. In this connection the arrangements may be such that the outer wheel of the planetary gear drive can be stopped or it may be released. Thus, the planetary gear drive can function as a type of coupling or clutch for disconnecting the weft thread insertion members from the respective driving spacial crank drive.

BRIEF DESCRIPTION OF THE DRAWINGS

In order that the invention may be clearly understood, it will now be described, by way of example, with reference to the accompanying drawings, wherein:

FIG. 3a shows a simplified view of the power output side of a spacial crank drive;

FIG. 3b shows a sectional view along section line 3b—3b in FIG. 3a;

DETAILED DESCRIPTION OF PREFERRED EXAMPLE EMBODIMENTS AND OF THE BEST MODE OF THE INVENTION

Figure 1:
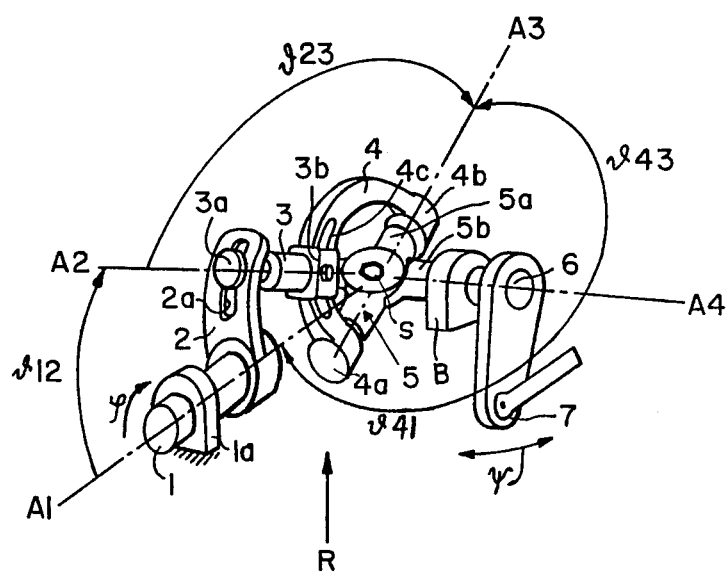
FIG. 1 is a perspective view of a spacial crank drive for explaining the basic concept or principle of such drives.
Figure 2:
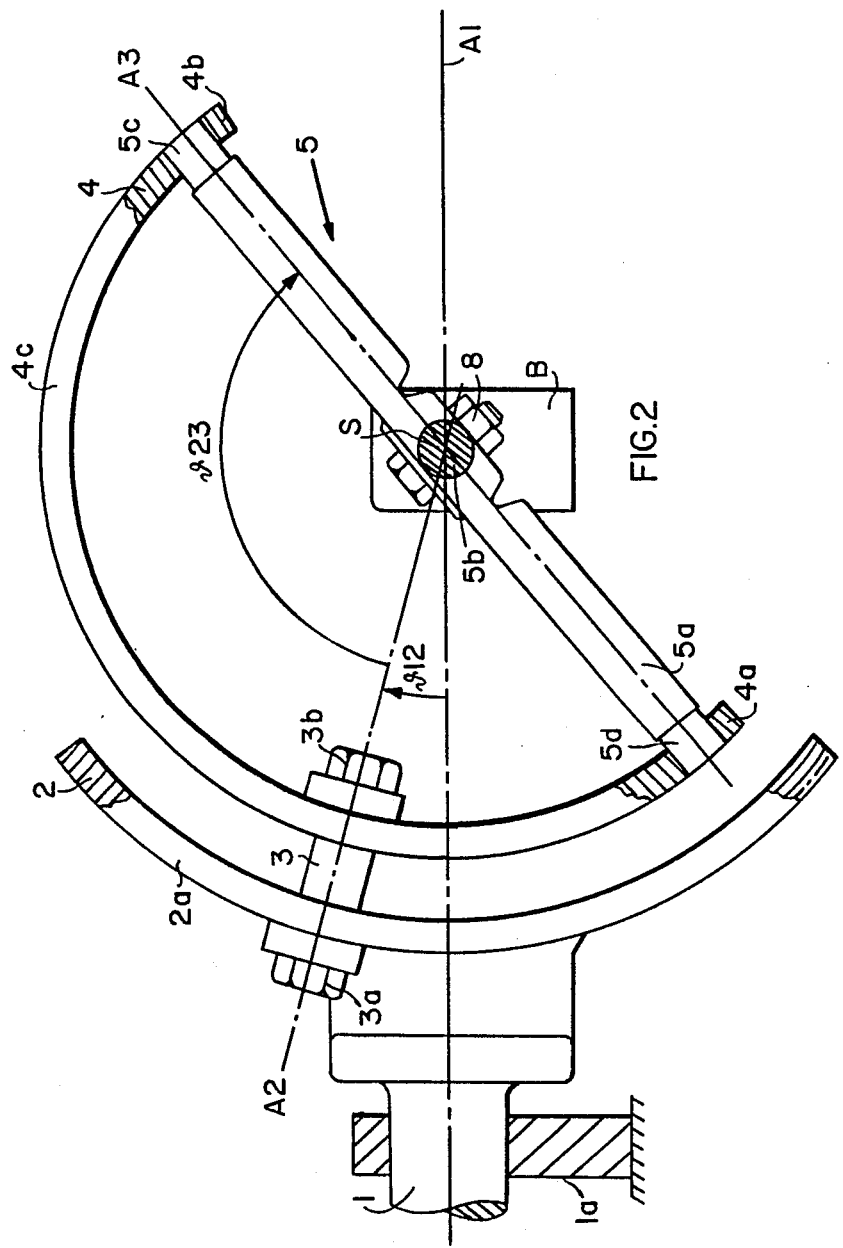
FIG. 2 illustrates a side view partially in section of a spacial crank drive according to the invention.
Figure 3:
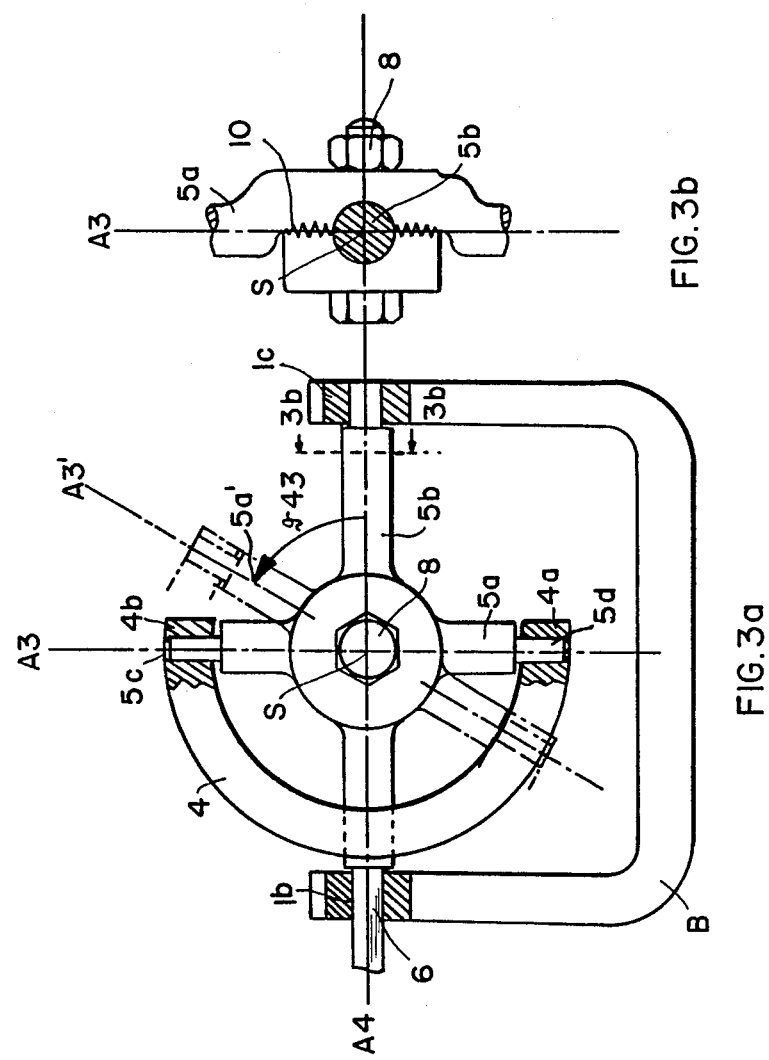

FIG. 1 shows a schematic, perspective view of a spacial crank drive R having four axes A1, A2, A3, and A4 intersecting in a common junction point S. A drive shaft 1 constituting a power input is rotatably mounted in a frame member 1a. The drive shaft 1 rotates about the axis A1 through an angle $\theta$. One end of a crank arm 2 is rigidly secured to the input drive shaft 1. A coupling member 3 is connected with one end 3a in a slot 2a of the crank arm 2. The end 3a may be a screw or nut as shown in FIG. 2. The other end 3b of the coupling member 3 may also be a screw or nut and is operatively secured to a transmission member 4 which is in the form of a bail having two ends 4a and 4b mounted for tilting about the axis A3. The end 3b is adjustably connected in a slot 4c of the bail type transmission member 4. The slots 2a and 4c are wide enough to permit a shifting of the coupling member 3 relative to the crank arm 2 and/or relative to the transmission member 4 when the screw or nut is loosened during standstill. The longitudinal axis 2 passes lengthwise through the coupling member 3 and through the common junction point S. The ends 4a and 4b of the bail type transmission member 4 are journalled to one arm 5a of a cross-pin 5. The cross-pin 5 has another arm with a longitudinal axis coinciding with the axis A4. The longitudinal axis of said one arm 5a of the cross-pin 5 coincides with the axis A3. The arm 5b of the cross-pin 5 is tiltably mounted in the frame member 1a. The arm 5a extends into the power take-off or output shaft 6 which also coincides with its longitudinal or rotational axis with the axis A4. Thus, the drive input shaft 1 with its axis A1 is mounted for rotation or tilting to the machine frame The power take-off or output shaft 6 with its axis A4 is mounted for rotation in a bail B as shown in FIG. 3a. The bail B is held in a machine frame and can be adjusted in its position during standstill in a continuous, stepless manner. However, the axes A1 and A4 retain their position in space during the operation of the present crank drive when the bail B is held in a fixed position The other two axes A2 and A3 are variable in their position during operation. However, the angles between the individual axes remain constant during the operation. The angle $\theta_{12}$ between the axis A1 and A2. The angle $\theta_{23}$ is enclosed between the axis A2 and A3. The angle $\theta_{43}$ is enclosed between the axis A3 and A4. The angle $\theta_{41}$ is enclosed between the axis A4 and A1. A power take-off element 7 tilts back and forth with the power output shaft 6 as indicated by the angular power take-off range $\Psi$. The rotational motion of the drive shaft 1 is indicated by the arrow $\theta$ as stated above. The adjustability of the coupling member 3 is determined by the length of the guide slot 2a and of the guide slot 4c.

FIG. 2 shows a simplified embodiment of a spacial crank drive in which the drive shaft 1 is rotatably mounted in the machine frame 1a. The crank arm 2 has the shape of a circular arc and the guide and adjustment groove 2a extends substantially along the length of the crank arm 2. The origin or center of the circular arc of the crank arm 2 is located in the common intersection S. The transmission member 4 also has the shape of a circular arc concentric with the circular arc of the crank arm 2. The guide and adjustment groove 4c also extends substantially along the entire length of the arc. Thus, the coupling member 3 is adjustable throughout a substantial arcuate range. The transmission member 4 is tiltable about the journal studs 5c and 5d of the cross-pin 5. Thus, the transmission member 4 is tiltable about the axis A3. The particular construction of the coupling member 3 is not critical for the invention provided that the coupling member 3 operatively couples the crank arm 2 to the transmission member 4. More specifically, it must be assured that during the operation the transmission member is able to rotate about the axis A2 passing longitudinally through the coupling members 3 and through the common intersection S. The adjustment of the coupling member 3 during standstill is accomplished, for example, by loosening the connecting screw 3a, thereby freeing the rigid connection between the coupling member 3 and the crank arm 2 for shifting the coupling member 3 along the guide groove 2a, whereby the angle $\theta_{12}$ is adjustable in a continuous, stepless manner during standstill. After the adjustment of the angle $\theta_{12}$ to a defined value, the screw 3a is tightened again. During this type of adjustment the relative position of the coupling member 3 to the transmission member 4 remains unchanged. Thus, the angle $\theta_{12}$ is adjusted while the angle $\theta_{23}$ remains unchanged, whereby the output angular range $\Psi$ of the output stroke or output amplitude may be increased or decreased.

However, there is also the possibility of adjusting the coupling member 3 by maintaining the rigid connection to the crank arm 2 and loosening the screw 3b to release the connection between the coupling member 3 and the transmission member 4, whereby the transmission member 4 can be displaced relative to the coupling member 3, more specifically, relative to the axis A2 so that the angle $\theta_{23}$ may be changed in a continuous, stepless manner during standstill. After the adjustment of the angle $\theta_{23}$ the screw 3a is tightened again. This change of the angle $\theta_{23}$ results in a displacement of the location of the oscillating stroke or amplitude of the power take-off member 7, whereby additionally any dwell times may also be adjusted without changing the oscillation stroke or amplitude. Changing the location of the oscillation stroke or amplitude must be distinguished from changing the amplitude or stroke itself. The just described adjustments of the coupling member 3 relative to the crank arm 2 and/or relative to the transmission member 4 can also be made together to achieve an optimal range of adjustments for the angles $\theta_{12}$ and $\theta_{23}$, whereby different transmission characteristics may be superimposed one on the other.

The above described adjustments after loosening the screws 3a and/or 3b permit a stepless continuing adjustment of the coupling member 3 relative to the crank arm 2 and relative to the transmission member 4 during standstill. However, for certain applications it may be quite satisfactory to provide for stepped adjustments of the coupling member 3. In that case, the crank arm 2 and the transmission member 4 may be provided with stepped adjusting positions for the connecting member 3.

FIG. 3a shows the power output side of a spacial crank drive in a simplified form, whereby the cross-pin 5 with its arm 5b is journalled in bearings 1b and 1c in a bail B adjustably held in a machine frame not shown. The axis A4 has a fixed location in space during operation, but permits the tilting or journalling movement of the cross-pin 5 about the axis A4, thereby also permitting the oscillating movement of the power output shaft 6. The other arm 5a of the cross-pin 5 has a longitudinal axis coinciding with the axis A3 and the journal pins 5c and 5d are tiltably mounted in the transmission member 4 as described above. Incidentally, the other arm 5a does not necessarily have to extend at a right angle to the one arm 5b of the cross pin 5. These arms can be adjustable relative to each other, for example, by rotating the arm 5a into a position 5a' defining a longitudinal axis A3' as shown in dash-dotted lines in FIG. 3a. The angle $\theta_{43}$ is enclosed between the axis A4 and A3'.

FIG. 3b illustrates how the two arms of the cross-pin 5 can be fixed in different angular positions relative to each other. For this purpose, a nut and bolt 8 extends through the two arms of the cross-pin 5. Upon loosening the nut 8, the two arms of the cross-pin 5 can be rotated relative to each other, thereby changing, in a continuous, stepless manner the angle $\theta_{43}$ between the axes A3 and A4.

Teeth 10 are provided in the interfacing portions between the two arms of the cross-pin 5 so that a rigid interconnection between the two arms is assured when the nut 8 is tightened again. The location of the common point of intersection S remains the same in all instances.

Referring to FIGS. 4 to 8, the several adjustment possibilities will now be described.

Figure 4:
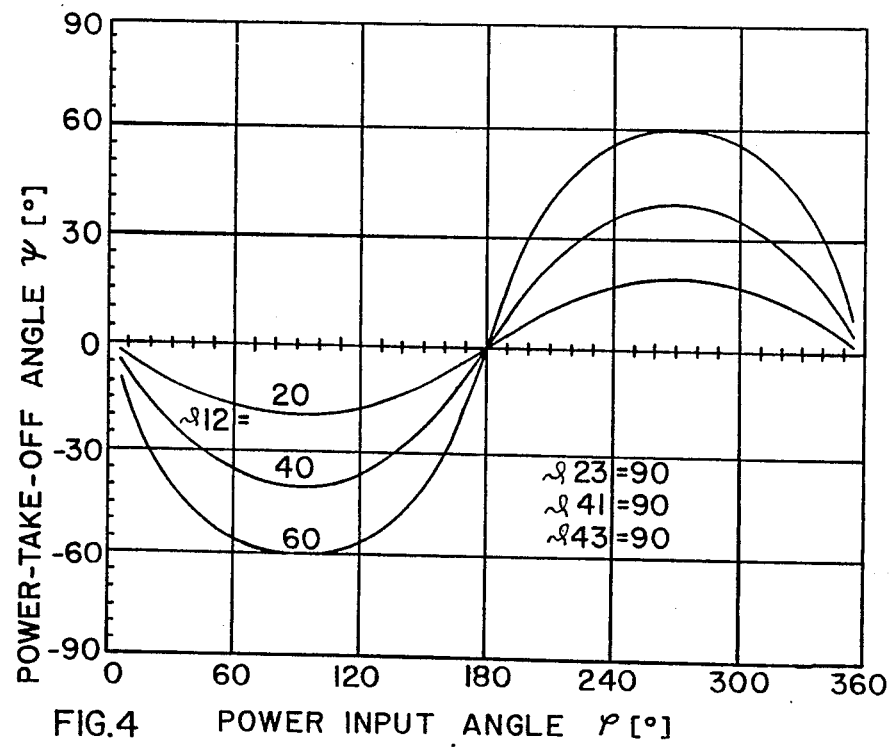
FIGS. 4 to 8 illustrate different transmission functions or characteristics of a spacial crank drive according to the invention showing the angular range $\Psi$ of the power output motion as a function of the angular range $\phi$ of the power input motion with several parameters for the angular adjustments contemplated according to the invention.

FIG. 4 shows the angular range $\Psi$ of the power output shaft 6 as a function of the angular range $\phi$ of the power input shaft 1. Let it be assumed that each angle $\theta_{23}$, $\theta_{43}$, and $\theta_{41}$ is a 90° angle. The angle $\theta_{12}$ shall be varied in 20° steps thus 20°, 40°, and 60°. As a result, more specifically, due to the change of the position of the rotational axis A2 that follows the axis A1 of the drive shaft, the oscillation amplitude $\Psi$ at the output member 7 or rather the stroke thereof, is adjustable. The stroke or amplitude increase is proportional to the increase in the angle $\theta_{12}$. Incidentally, the output motion or oscillation is not an exact sine function, rather it is a uniform oscillating motion.

Figure 5:
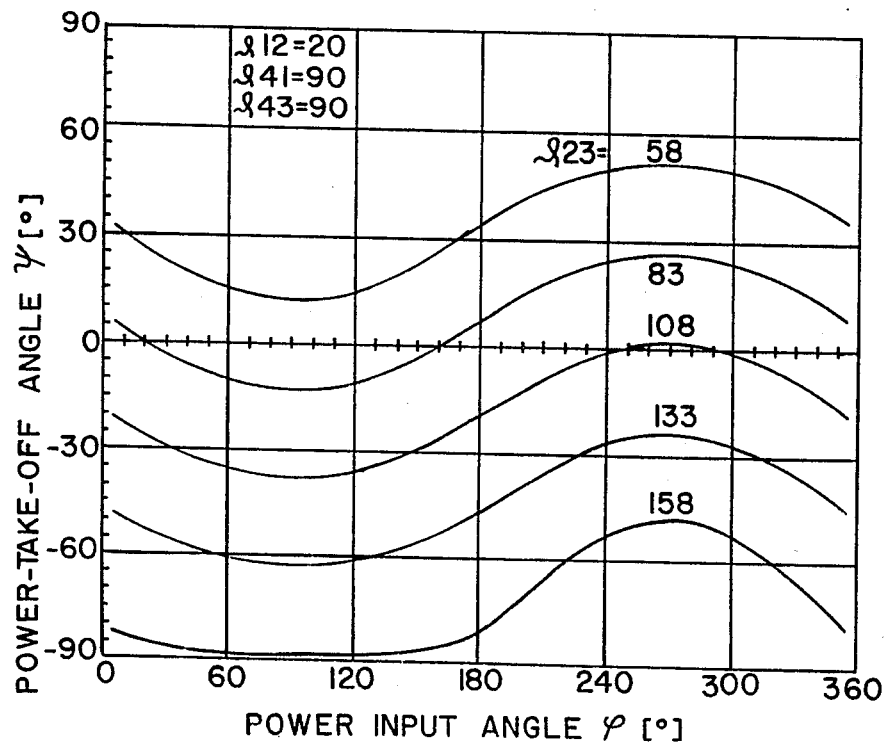

FIG. 5 illustrates the situation in which the angles $\theta_{12}$, $\theta_{41}$ and $\theta_{43}$ are maintained constant while the angle $\theta_{23}$ at the transmission member 4 is adjusted. As shown by the curves the amplitude or stroke of the output angular range is maintained. However, the entire vibration range is shifted in one or the opposite direction. The respective angular values for the angle $\theta_{23}$ are shown to be 58°, 83°, 108°, 133° and 158°.

It is noted that, as the angle $\theta_{23}$ increases, the dwell times in the end position of the oscillating motions also become longer. These dwell times become the longer, the closer the sum of the angles $\theta_{12}$ plus $\theta_{23}$ approaches 180°. The shifting of the oscillation range thus has the same effect as a phase shift.

Figure 6:
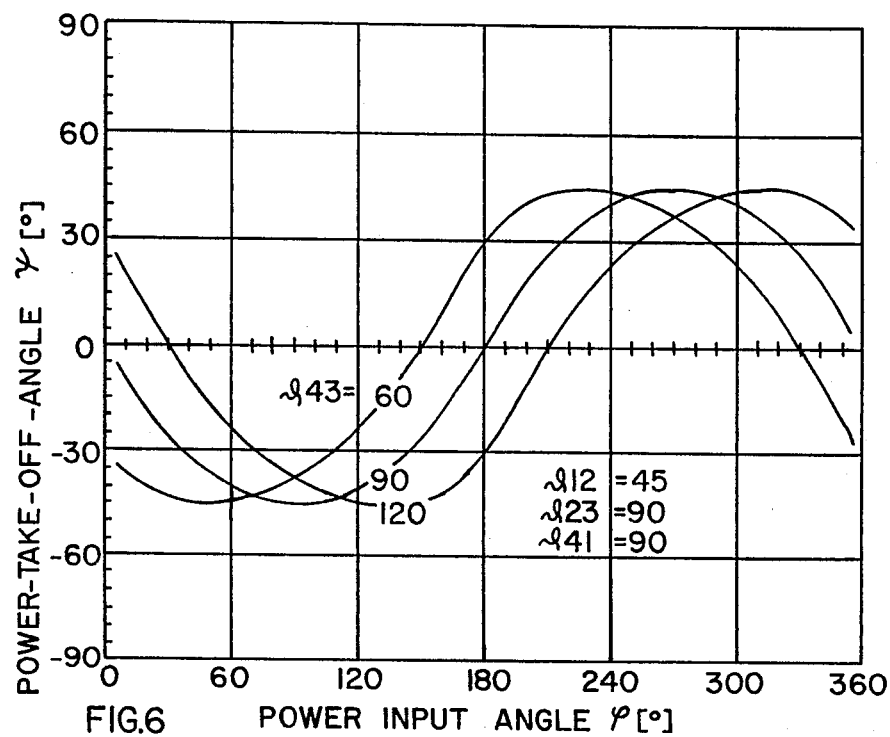

FIG. 6 shows the adjustment situation in which the angle $\theta_{43}$ between the axis A3 and A4 is changed, whereby a phase shift is accomplished in the power take-off oscillation motion in one or the other direction. Additionally, a slight distortion of the oscillatory motion is noted if the curves for the angle $\theta_{43}$ at 60° and 120° are compared with the curve for the angle $\theta_{43}$ at 90°. In FIG. 6 the angle $\theta_{12}$ is 45° and the angles $\theta_{23}$ and $\theta_{41}$ are 90°.

Figure 7:
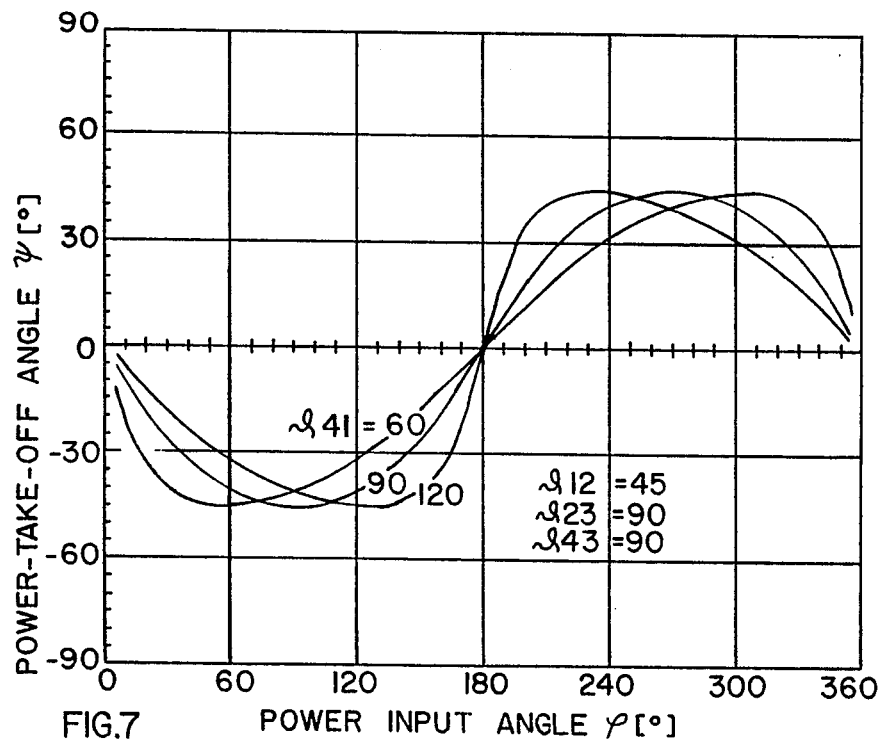

FIG. 7 illustrates the influence of the angular adjustment of the angle $\theta_{41}$ between the axis A4 and A1 at 60°, 90°, and 120°. The angle $\theta_{12}$ is again 45° and the angles $\theta_{23}$ and $\theta_{43}$ is each 90°. In this adjustment of the angle $\theta_{41}$ by a respective adjustment of the bail B shown in FIG. 3a, the transmission function is distorted somewhat more pronounced than in FIG. 6. Referring to the transmission function or characteristics of FIG. 7, it is possible to convert a uniform rotational drive motion into a nonuniform oscillating output motion or into a nonuniform rotational output motion.

Figure 8:
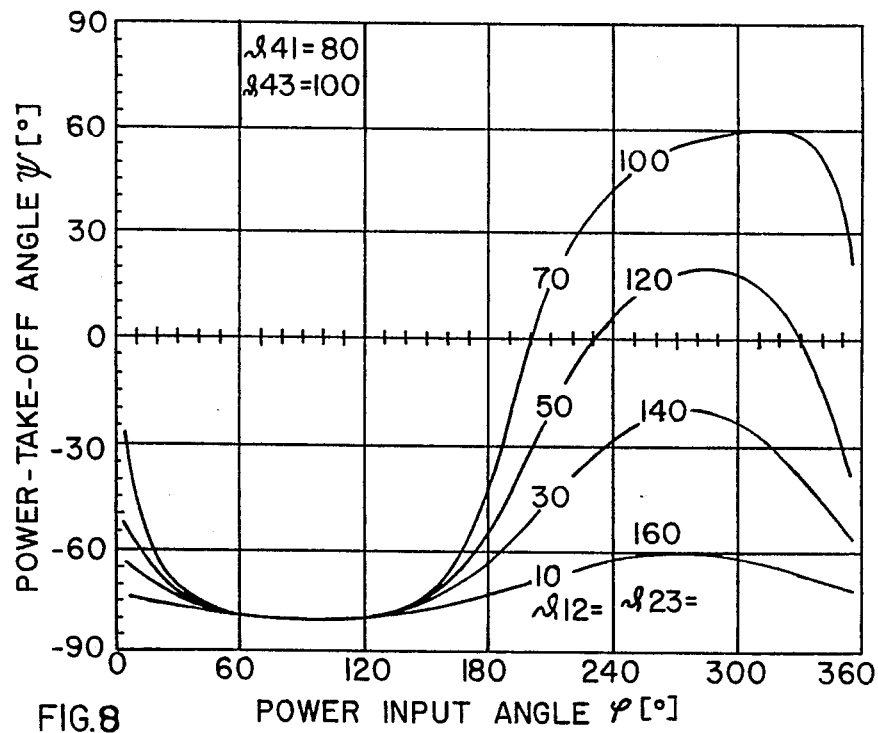

FIG. 8 illustrates the superposition of the several output functions, whereby the angle $\theta_{41}$ is 80°, the angle $\theta_{43}$ is 100° and the angles $\theta_{12}$ and $\theta_{23}$ are the variable parameters. Thus, $\theta_{12}$ is 10°, 30°, 50°, and 70° while $\theta_{23}$ is 160°, 140°, 120°, and 100° respectively. Thus, the sum of the respective angles $\theta_{12}$ and $\theta_{23}$ is constant, namely 170°. Substantial dwell times have been achieved at the end position of the oscillating motion for this sum of 170° for the angles $\theta_{12}$ plus $\theta_{23}$. However, if the proportion of the angle $\theta_{12}$ increases, for example to 70°, the total stroke or amplitude also increases. As a result, the uppermost curve becomes distorted as compared to a sine wave.

Figure 9:
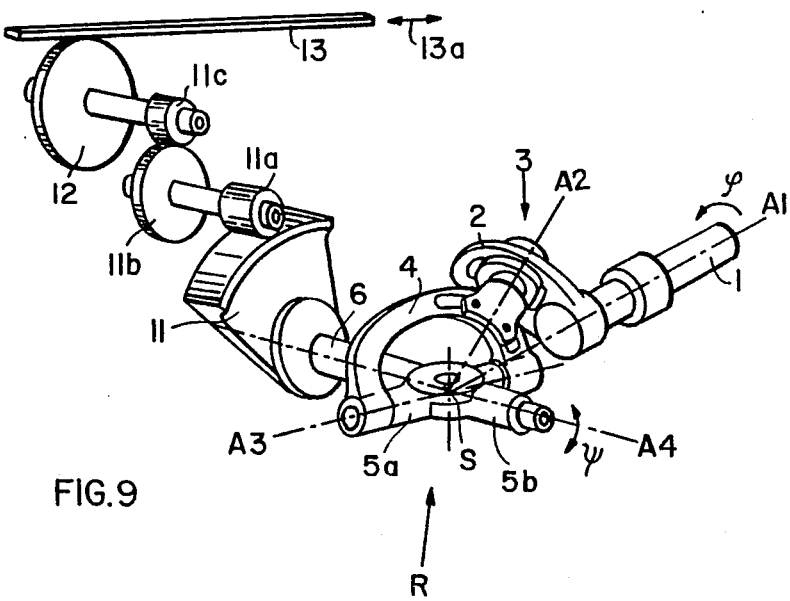
FIG. 9 shows an embodiment of a spacial crank drive according to the invention in conjunction with a drive for the gripper rods of a shuttleless loom.

FIG. 9 illustrates schematically a spacial crank drive R for producing a back and forth oscillating motion for driving the gripper rods of a shuttleless loom. This crank drive embodies the invention in that at least two of the angles enclosed between the four axes are freely selectable as taught herein. The individual elements shown in FIG. 9 have the same reference numbers as those in FIG. 1. Here again, the drive shaft 1 rotates uniformly as indicated by the arrow $\phi$. The output motion of the gripper rod 13 is a back and forth motion resulting form the oscillatory movement $\Psi$. A rack 11 and a pinion 11a convert the oscillating movement into a back and forth movement 13a, thereby further gears 11b and 11c drive a pinion 12 which in turn meshes with the gripper rod 13 constructed as a rack. The connection between the coupling member 3 and the crank arm 2 is adjustable for the adjustment of the respective angle as has been described above with reference to FIG. 2. The adjustment is such that all the four axes A1, A2, A3 and A4 pass through the common point of intersection S. As described above, the angle $\theta_{12}$ and the angle $\theta_{23}$ are adjustable individually or in common.

Figure 10:
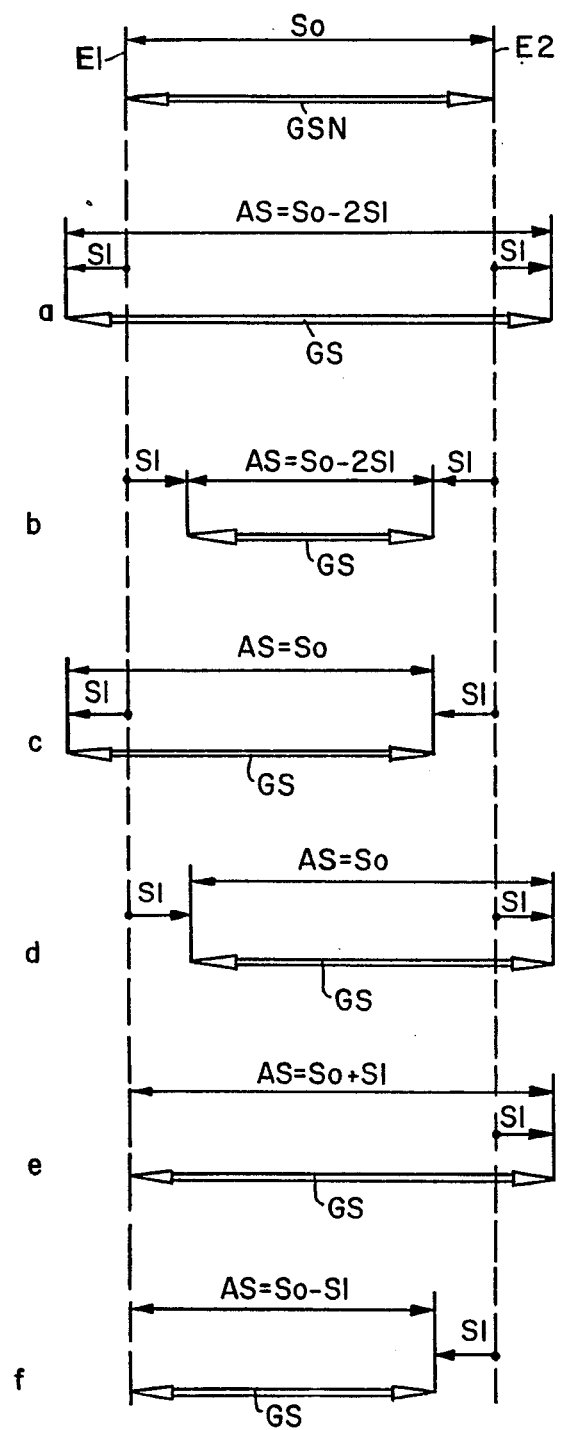
FIG. 10 illustrates different adjustment possibilities for a spacial crank drive according to FIG. 9.

FIG. 10 illustrates schematically the motion sequences that are possible with a crank drive as shown in FIG. 9. E1 and E2 designate the end positions of the weft thread insertion motion of the gripper rod 13 in a shuttleless loom. The gripper movement GS is shown in each of the steps by a double line double arrow. The possible dimensions or variations of the gripper stroke AS are indicated by sincle line arrows. A normal starting displacement or stroke So provides a normal gripper movement GSN. The different situtations (a) to (f) illustrate the influence of different adjustments of the angles $\theta_{12}$ and/or $\theta_{23}$. These situation will now be described.

Situation (a)

The angle $\theta_{12}$ is increased and the angle $\theta_{23}$ is maintained constant. Result: the stroke AS is increased at both ends by a distance S1, thus $AS = So + 2S1$.

Situation (b)

The angle $\theta_{12}$ is decreased, the angle $\theta_{23}$ is maintained constant. Result: the stroke is reduced at both ends by the distance S1, whereby the increase or decrease of the stroke GS is proportional to the change in the angle $\theta_{12}$, thus $AS - So - 2S1$.

Situation (c)

Angle $\theta_{23}$ is increased, and the angle $\theta_{12}$ is maintained constant. The gripper stroke or displacement So remains the same, however, the stroke range is shifted to the left beyond the normal end position E1 by the distance S1, thus $AS = So$.

Situation (d)

The angle $\theta_{23}$ is decreased and the angle $\theta_{12}$ is maintained constant. The stroke is shifted to the right by the distance S1, however, its length remains the same, only its reach extends beyond the normal end position E2, thus $AS = So$.

Situation (e)

The angle $\theta_{12}$ is increased and the angle $\theta_{23}$ is decreased, whereby the sum of the angle $\theta_{12}$ plus $\theta_{23}$ is constant, whereby a stroke increase beyond the normal end position E2 is obtained, namely $S = So + S1$. However, the end position E1 is maintained, thus $AS = -So + S1$.

Situation (f)

The angle $\theta_{12}$ is decreased and the angle $\theta_{23}$ is increased, whereby the sum of $\theta_{12}$ plus $\theta_{23}$ is constant. As a result, the stroke is decreased by the distance S1 so that the total stroke $AS = So - S1$. However, the normal end position EA is maintained.

It will be appreciated that it is also possible to maintain the end position E2 and increase the size of the stroke to the left of the normal end position E1.

The simple selection and adjustment of the angles between the respective crank drive axis enables selecting the positions of the end of a stroke where it begins its return motion and these adjustments may be done within and outside the loom shed as required.

As mentioned, a displacement of the stroke range also changes the dwell times, thus making it possible, for example, in gripper rod looms to keep the gripper stationary in one or the other or both end positions for a time duration of selectable lengths, for example, in order to use this time for a safe and certain thread transfer from one gripper to the other. This feature has the advantage that, for example, any adverse effects of an adjustment of the dwell time by changing the angle $\theta_{23}$, for example, due to an undesired influence on a phase shift due to a knot tying, may be compensated again by superimposing on the motion characteristic an intended change by varying the angle $\theta_{43}$. Conversely, it is also possible to achieve in an analogous manner an amplification of the effect of a phase shift if that is desirable. A further possibility of adapting the displacements due to dwell times is provided in that the coupling of the power take-off element to the power output shaft may be changed, for example, by securing the power take-off element 7 to the shaft 6 at another angle.

Similar considerations apply with regard to the occurrence and use of the above mentioned distortions and nonsymmetries in the motion characteristics. Thus, it is possible by superimposing individual angular changes, or rather transmission functions adjusted by these changes, so that for example, a dwell time in an end position of the gripper rod 13 may be followed by an increased speed of the gripper rod. On the other hand, it is also possible to, for example, compensate an undesirable distortion in the speed characterstic as a result of a change in the angle $\theta_{43}$, by correspondingly changing the angle $\theta_{41}$. It is very simple to achieve such a compensation.

Figure 11:
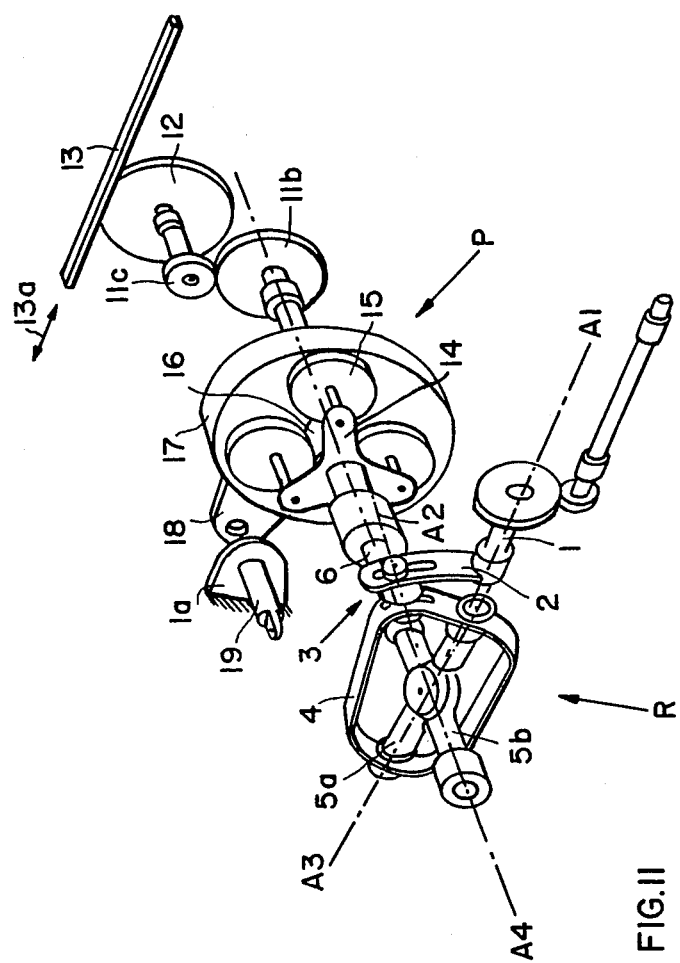
FIG. 11 illustrates a modification of the crank drive according to FIG. 9, arranged in series with a planetary gear drive.

FIG. 11 shows an embodiment similar to that of FIG. 9 including a spacial crank drive R for the back and forth driving of gripper rods 13 in a shuttleless loom. The same adjustment possibilities as described above for FIG. 9 are available for the embodiment of FIG. 11 having regard to FIG. 10. These adjustments are obtained by varying the position of the coupling member 3 relative to the crank arm 2 and the transmission member 4. In FIG. 11, a rotary gear wheel drive such as the planetary gear P is interposed between the crank drive R and the gear wheels 11b, 11c, 12, the latter of which meshes with the gripper rod 13 formed as a toothed rack for a back and forth movement as indicated by the arrow 13a. Referring to FIG. 11, the drive shaft 1 driven by the general drive system of the loom, for example, drives through the crank drive R a three armed drive element 14 carrying a planetary gear wheel 15 at each of its arms. The outer gear wheel 17 of the planetary gear P is blocked against rotation by a flange arm 18 connected through a bolt 19 through the machine frame 1a. Thus, when the arm 18 is engaged by the bolt 19, the outer planetary gear wheel 17 cannot rotate. The output or power take-off from the planetary gear P is provided by the sun wheel 16 for driving the pinion 12 through the gear wheels 11b and 11c. Thus, the gripper rod 13 is moved back and forth as described. The planetary gear P translates the output r.p.m. of the drive 6 to a higher r.p.m.

When the bolt 19 is released, the outer gear wheel 17 is no longer blocked, whereby the outer wheel 17 begins rotating, thus stopping the sun wheel 16. In this instance the planetary gear P functions as a separation coupling member between the spacial crank drive R and the rack and pinion drive of the gripper rod 13. Thus, the planetary gear P performs two functions. When the gripper rod 13 is to be moved, the planetary gear translates the output r.p.m. to a higher r.p.m. When the gripper rod is to be stopped the planetary gear functions as a coupling member. The decoupling may be accomplished, for example, automatically in response to the sensing of a fault in the loom, for example, when a thread should break.

Figure 12:
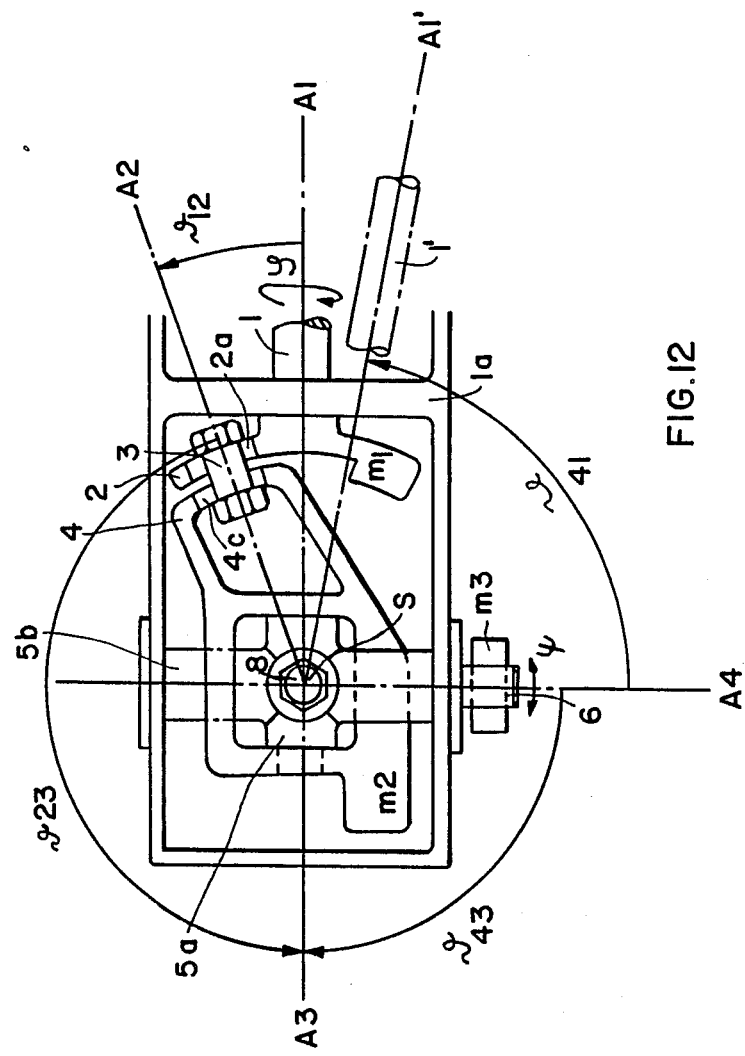
FIG. 12 illustrates the possibility of balancing a spacial crank drive according to the invention.

FIG. 12 illustrates another embodiment of a spacial crank drive according to the invention. The view is such that all crank drive axes A1, A1', A2, A3 and A4 are located in the plane of the drawing sheet. All axes intersect in the common junction point S. Here again, the axes A1 and A4 are mounted in fixed bearings in the machine frame 1a. Thus, the drive shaft 1 and the power output shaft 6 are held in fixed positions. The crank arm 2 and the transmission member 4 have circular arc portions with the respective guide 2a and 4c. The origin of the circular guide slots 2a and 4c is located at the intersection S. The connection of the coupling member 3 to the crank arm 2 and to the transmission member 4 permits a rotation of the transmission member 4 relative to the crank arm 2. Here again, the angles $\theta_{12}$ and $\theta_{23}$ are adjustable as described above. The drive shaft 1 with its crank drive 2 and the coupling member 3 can be statically and dynamically balanced relative to the axis A1. The mass m1 balances the crank arm 2. The mass m2 provides a static balancing of the transmission member 4. A mass m3 dynamically balances the cross pin 5 relative to the power output axis A4. In FIG. 12 it is also possible to adjust the angle $\theta_{43}$ between the two axes A3 and A4 of the cross-pin 5. This adjustment is possible by loosening and then again tightening the screw 8 as described above with reference to FIGS. 3a and 3b.

A crank drive as described with reference to FIG. 12, is especially suitable for the many, versatile transmission functions described above with reference to FIGS. 4 to 8. These transmission functions are accomplished by the super position of the individual angular adjustments. The strokes length can be adjusted by changing the angle $\theta_{12}$. The stroke range may be shifted and the dwell times may be selected as desired by changing the angle $\theta_{23}$. Changes in the phase position and under certain circumstances certain distortions can be obtained by changing the angle $\theta_{43}$. All angles can be adjusted either in steps or in a stepless continuous manner. If the distortions resulting from the change in the angle $\theta_{43}$ are not sufficient for modifying the circumferential speed of the output in the desired manner, it is possible as indicated in FIG. 2, to also change the angle $\theta_{41}$ between the power take-off axis A4 and the power input axis A1 in that this angle does not need to be 90°, but may be modified as described above. The drive shaft 1 with its axis A1 may thus be brought into the position 1', thereby providing a new axis A1'. However, in most instances it is sufficient if the angle $\theta_{41}$ is adjusted to a predetermined fixed value and thus a stepless adjustment is not necessary. The spacial crank drive according to the invention provides a large range of freedom for the adjustment of the most advantageous transmission function. In addition, it is possible to ascertain the machine dynamic best operating conditions to reduce vibrations and the like. Thus, machine characteristics due to its elasticity and due to its vibration characteristics, can be easily influenced by the crank drive according to the invention, or rather compensated by the present adjustments.

As mentioned, the crank drive as disclosed herein is not only suitable for looms, it may also be used in other equipment, such as farm equipment, robot equipment and the like.

Although the invention has been described with reference to specific example embodiments, it will be appreciated, that it is intended to cover all modifications and equivalents within the scope of the appended claims.

What I claim is:

1. A crank drive for converting a rotating input drive motion into an output drive motion, comprising a power input shaft (1) defining a first input axis (A1), a crank arm (2) connected to said power input shaft (1), first means for rotatably mounting said power input shaft (1) in a machine frame, power output means (6) for providing a power-take-off, second means operatively mounting said power output means (6) to said machine frame, a coupling member (3) defining a second axis (A2), third means (3a) for adjustably connecting said coupling member (3) to said crank arm (2), whereby said coupling member (3) is arranged eccentrically to said power input shaft (1), a transmission member (4) defining a third axis (A3), fourth means operatively connecting said transmission member (4) to said power output means (6) defining a fourth axis (A4), said first, second, third, and fourth axes (A1, A2, A3, A4) intersecting in a common point (S), fifth means (3b) for adjustably connecting said coupling member (3) to said transmission member (4), whereby said transmission member (4) is connected in a pivotable manner to said power input shaft, said power input shaft and said power output means taking up axial positions fixed in space during an operation of the apparatus, said first axis (A1) and said second axis (A2) enclosing a first adjustable angular spacing ($\theta_{12}$), said second axis (A2) and said third axis (A3) enclosing a second adjustable angular spacing ($\theta_{23}$), said third axis (A3) and said fourth axis (A4) enclosing a third adjustable angular spacing ($\theta_{43}$), said fourth axis (A4) and said first axis (A1) enclosing a fourth adjustable angular spacing ($\theta_{41}$), and wherein said first, second, third, and fourth adjustable angular spacings ($\theta_{12}$, $\theta_{23}$, $\theta_{43}$, $\theta_{41}$) are changeable by selectively and independently of one another changing one or more angular positions of said first, second, third, and fourth axes that follow each other from the power input shaft to said power output means.

2. The crank drive of claim 1, wherein said angular positions of said first, second, third, and fourth axes (A1, A2, A3, A4) and hence the respective angles are adjustable in a continuous, stepless manner.

3. The crank drive of claim 1, further comprising means for adjusting the angular position between said power input shaft and said power-take-off when said crank drive is not in operation.

4. The crank drive of claim 1, wherein said crank arm (2) is curved along a circular arc, said crank arm being secured to said drive shaft (1) in a rotation transmitting manner, said circular arc of said crank arm (2) having a center of curvature located in said common intersection point (S), wherein said transmission member (4) comprises a bail arranged concentrically to said crank arm, said coupling member (3) pivotally interconnecting said crank arm (2) and said transmission member (4), and wherein said third and fifth connecting means (3a, 3b) can be loosened for an adjustment and tightened after an adjustment, whereby said coupling member (3) is displaceable relative to said crank arm (2) and also displaceable relative to said transmission member (4) so that one displacement is independent of the other displacement and vice versa.

5. The crank drive of claim 1, wherein said fourth connecting means include a cross-pin for connecting said transmission member (4) to said power output means (6), said power output means comprising a shaft formed by one arm of said cross-pin, said second means also rigidly mounting said one arm of said cross-pin to said machine frame, sixth means for journalling said transmission member (4) to another arm of said cross-pin, whereby said other arm of said cross-pin defines said axis (A3) of said transmission member (4), and seventh means (8) for adjustably connecting said two arms of said cross-pin to each other, whereby said angular spacing ($\theta_{43}$) between said third and fourth axes (A3, A4) is adjustable.

6. The crank drive of claim 5, further comprising balancing weights (m1, m3) for statically and dynamically balancing said power input shaft and said power-take-off.

7. The crank drive of claim 5, further comprising at least one balancing weight (m2) for statically balancing said transmission member (4) relative to said third axis (A3) defined by said transmission member.

8. A driving mechanism for a gripper rod of a shuttleless loom, comprising a crank drive for converting a rotating input drive motion into a back-and-forth output drive motion for moving said gripper rod into and out of a loom shed, said crank drive including a power input shaft (1) defining a first input axis (A1), a crank arm (2) connected to said power input shaft (1), first means for rotatably mounting said power input shaft (1) in a machine frame, power output means (6) for providing a power-take-off, second means operatively mounting said power output means (6) to said machine frame, a coupling member (3) defining a second axis (A2), third means (3a) for adjustably connecting said coupling member (3) to said crank arm (2), whereby said coupling member (3) is arranged eccentrically to said power input shaft (1), a transmission member (4) defining a third axis (A3), fourth means operatively connecting said transmission member (4) to said power output means (6) defining a fourth axis (A4), said first, second, third, and fourth axes (A1, A2, A3, A4) intersecting in a common point (S), fifth means (3b) for adjustably connecting said coupling member (3) to said transmission member (4), whereby said transmission member (4) is connected in a pivotable manner to said power input shaft, said power input shaft and said power output means taking up axial positions fixed in space during an operation of the apparatus, said first axis (A1) and said second axis (A2) enclosing a first adjustable angular spacing ($\theta_{12}$), said second axis (A2) and said third axis (A3) enclosing a second adjustable angular spacing ($\theta_{23}$), said third axis (A3) and said fourth axis (A4) enclosing a third adjustable angular spacing ($\theta_{43}$), said fourth axis (A4) and said first axis (A1) enclosing a fourth adjustable angular spacing ($\theta_{41}$), and wherein said first, second, third, and fourth adjustable angular spacings ($\theta_{12}$, $\theta_{23}$, $\theta_{43}$, $\theta_{41}$) selectively and independently of one another changing one or more of said first, second, third, and fourth axes that follow each other from the power input shaft to said power output means, whereby a displacement stroke of said gripper rod is adjustable by an adjustment of said angular spacings between said input drive shaft (1) and said power-take-off.

9. The driving mechanism of claim 8, further comprising a rapid translation planetary gear located in series with said crank drive, and means connectable between said machine frame and an outer edge (17) of said planetary gear for selectively arresting said outer edge.

* * * * *

UNITED STATES PATENT AND TRADEMARK OFFICE
CERTIFICATE OF CORRECTION

PATENT NO. : 4,784,005
DATED : 11/15/88
INVENTOR(S) : Jochen Balken

It is certified that error appears in the above-identified patent and that said Letters Patent is hereby corrected as shown below:

In Column 13, line 14 (claim 8), before "selectively" insert --are changeable by--.

Signed and Sealed this

Twenty-eighth Day of March, 1989

Attest:

DONALD J. QUIGG

Attesting Officer

Commissioner of Patents and Trademarks